H. S. ROBERTS.
SEAT.
APPLICATION FILED APR. 27, 1921.
1,415,711.
Patented May 9, 1922.
2 SHEETS—SHEET 2.
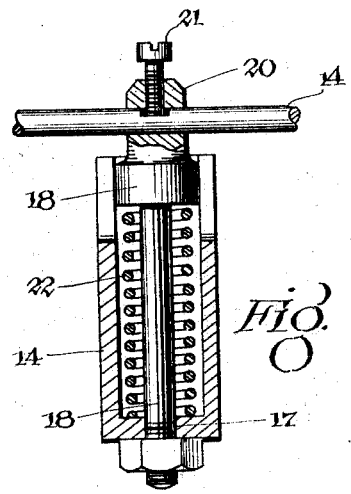
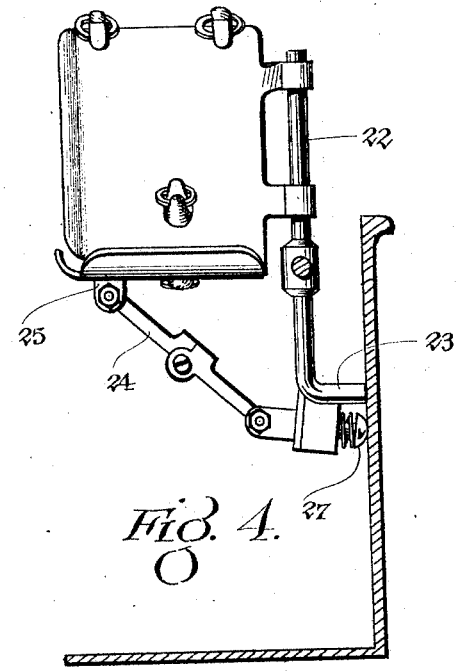
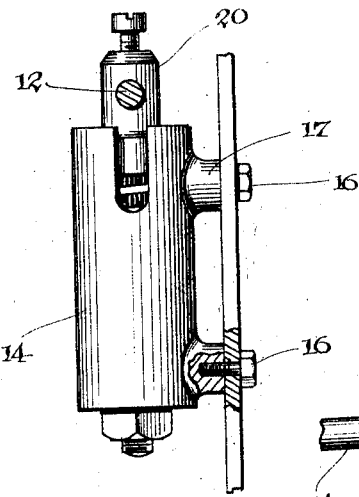
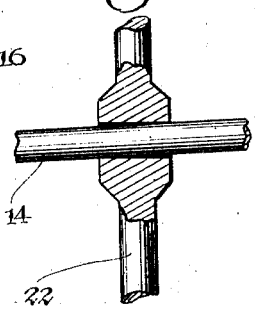
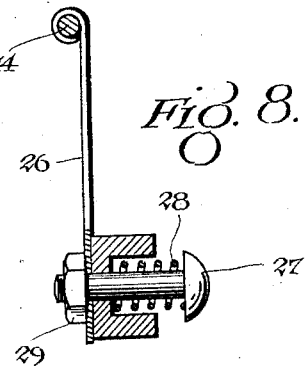
H. S. Roberts.
INVENTOR
BY
ATTORNEYS
WITNESSES

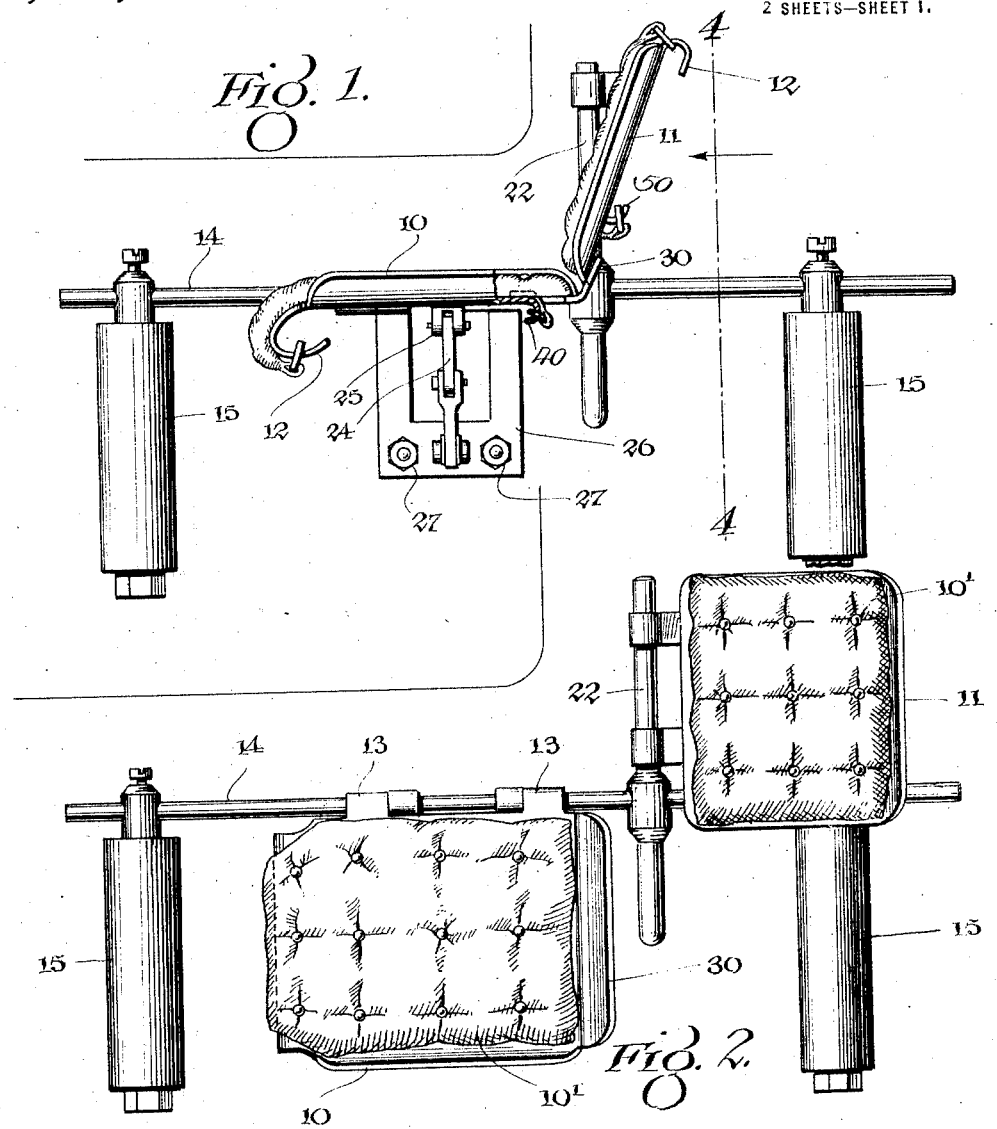
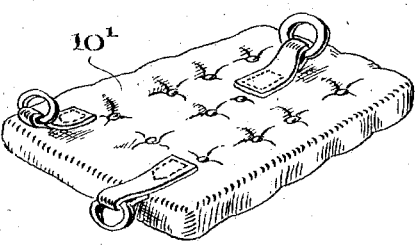

UNITED STATES PATENT OFFICE.

HIRAM S. ROBERTS, OF ALBANY, ALABAMA.

SEAT.

1,415,711.  Specification of Letters Patent.  Patented May 9, 1922.

Application filed April 27, 1921. Serial No. 464,841.

*To all whom it may concern:*

Be it known that I, HIRAM S. ROBERTS, a citizen of the United States, and a resident of Albany, State of Alabama, have invented certain new and useful Improvements in Seats, of which the following is a specification.

My invention relates to seats and more particularly to vehicle seats adapted for installation in a locomotive cab for the use of the engineer and fireman.

An object of the invention is to produce a seat of this kind which is comparatively cheap to manufacture, possesses great durability under the severe usage to which it is subjected and is extremely easy riding. A further object is to produce a seat which can be easily installed or taken down for repairs or other purposes and which can be readily folded so as to occupy practically no space when not in use.

Other and further objects of the invention will become apparent as this description proceeds.

Referring to the accompanying drawings for a description of one embodiment of the invention, Figure 1 is a side elevation of the seat support and the seat in position for use;

Figure 2 is a similar view showing the seat in folded position.

Figure 3 is an underside view of a seat cushion illustrating a means of attaching same to the seat;

Figure 4 is a vertical section on line 4—4 of Figure 1.

Figure 5 is a vertical longitudinal section through one of the spring supports of the seat;

Figure 6 is a side elevation of the same; and

Figures 7 and 8 are views illustrating certain details of construction.

The seat consists of a seat portion 10 and a back portion 11, preferably composed of sheet metal. As clearly shown in Figures 1, 2 and 4, the outer and rear edges of the seat portion 10 are rolled upwardly to form a receptacle for cushion 10', while the front edge is rolled downwardly to form a comfortable curve for the occupant's body, and terminates in a pair of upwardly curved lugs or hooks 12 for attaching the cushion. Projecting from the inner edge of said seat portion are a pair of sleeves 13, through which passes a steel rod 14, the said rod being supported adjacent its forward and rear ends by a pair of spring devices 15. Each of the spring devices consists of a vertical cylinder rigidly attached to the side of the engine cab by means of screw bolts 16 passing through holes in the metal sides of the cab and screwing into threaded holes in a pair of lugs 17 which project laterally from the upper and lower ends of the cylinder. The upper end of the cylinder is open and in the lower head is a central hole through which passes a piston rod 18 having a piston 19 attached to its upper end. Piston 19 has an integral extension 20, through which passes the end of rod 12, the rod being held from longitudinal movement with respect to the piston by means of a screw 21 in the extension engaging a slot in the rod, as clearly shown in Figure 5. Surrounding the rod in the cylinder is a spring 22 adapted to be compressed between the piston and the lower head of the cylinder, there being a nut screwed on the outer end of the piston rod to limit the upward movement thereof and to provide a means of adjustment for the spring. A pair of diametrically opposed slots in the upper end of the cylinder in alinement with rod 12 permits downward movement of the latter.

The back portion 11 of the seat is slidably and pivotally supported on a vertical rod 22, which is slidably mounted on rod 14, the latter passing through a hole in an enlargement of rod 22. As indicated in Figure 7, the axis of this hole is at a slight angle to the axis of rod 14 when the parts are in operative position, and the hole is somewhat larger than the rod. This construction permits rods 22 to be slid on rod 14 when the hole is brought into axial alignment with the rod, but resists such movement when the parts are in operative position as represented in Figures 1 and 7. An extension of the rod 22 below its enlargement terminates in a right angular portion 23 which is adapted to abut the side of the cab when the parts are in operative position, as shown in Figure 4.

The cushions 10' are secured to the seat and back parts by means of rings secured to straps sewed on the back of the cushions, said rings being adapted to engage the hooks 12 at the front and upper edges of the seat and back respectively and marginal hooks 40 and 50 associated with an aperture near the rear edge of the seat and the lower edge of the back, respectively, said aperture permitting passage of the ring.

The seat 10 is held in operative position by means of a knuckle-jointed brace rod 24, the upper member of which is pivoted in a bifurcated lug 25 secured to the under side of the seat near the outer edge thereof, while the lower member is pivoted centrally to the connecting part of a U-shaped frame 26, the upper ends of which are formed with sleeves pivoted on rod 14 between the sleeves 13. Frame 26 is adapted to yieldingly engage the side of the cab by means of a pair of bolts 27, which are slidably mounted in the frame and are resiliently held thereto by a spring 28 which tends to force the bolt outwardly, a nut 29 screwed on the inner end of said bolt limiting this outward movement.

Figure 2 represents the seat in folded or inoperative position. In this position, it will be seen that the seat occupies a negligible space in the cab, as it is folded flat against the sides thereof where it will not interfere with the movements of the engineer and fireman. To put the seat in position for use, the back 11 is first swung to operative position; seat 10 is then swung up, an upwardly and rearwardly projecting lip 30 thereof engaging the lower edge of the back and holding it in operative position. To fold the seat against the side of the cab, all that is necessary to be done is to break the knuckle joint of brace 24, swing the seat down and then swing the back rearwardly to a position in the same plane with the seat.

The seat may be assembled and disassembled very easily and quickly, as its supports are secured to the cab only by the screws 16. As the seat is cushioned for vertical movement by the spring devices 14 and also for swinging movement in a plane at right angles to its vertical movement, it will be clear that the construction provides an extremely easy riding seat. The seat and its supporting parts being ruggedly constructed entirely of metal and practically indestructible.

While I have described an embodiment of my invention with great particularity, I do not intend thereby to limit the invention to the specific details described, but what I claim as new and desire to secure by Letters Patent is:

1. A vehicle seat of the kind described, comprising a pair of spaced cylinders secured to the vehicle, piston rods slidable through the lower heads of said cylinders, pistons secured to the upper ends of said rods, springs surrounding said piston rods in said cylinders, nuts screwed on the outer ends of said piston rods, said pistons having upper extensions provided with transverse apertures, a rod passing through said apertures, a second rod slidably mounted on said first mentioned rod and having a lower right-angled extension adapted to abut a relatively stationary part of the vehicle, a seat portion formed of sheet metal and having a pair of sleeves formed on its outer edge surrounding said first mentioned rod, a U-shaped frame of sheet metal pivoted on said first mentioned rod between said sleeves, a knuckle-jointed brace rod having its upper member pivoted to the under side of said seat near the outer edge thereof and having its lower member pivoted to the lower part of said frame, bolts slidably mounted in the lower part of said frame and having outer heads adapted to slidably engage a relatively stationary part of the vehicle, springs surrounding said bolts between the outer heads thereof and said frame, nuts on the inner ends of said bolts, a back pivoted to the upper portion of said second rod, said seat having an upwardly and rearwardly projecting lip adapted to engage the lower edge of said back to hold the latter in operative position.

2. A vehicle seat of the kind described, comprising a pair of spaced cylinders secured to the vehicle, piston rods slidable through the lower heads of said cylinders, pistons secured to the upper ends of said rods, springs surrounding said piston rods in said cylinders, stops secured to the outer ends of said piston rods, said pistons having upper extensions provided with transverse apertures, a rod passing through said apertures, a second rod slidably mounted on said first mentioned rod at right angles thereto and having a lower right-angled extension adapted to abut a relatively stationary part of the vehicle, a seat having its outer edge pivoted to said first mentioned rod, a frame pivoted and slidably on said first mentioned rod, a knuckle jointed brace rod having its upper member pivoted on the under side of said seat near the outer edge thereof and having its lower member pivoted to the lower part of said frame, bolts slidable resiliently in the lower part of said frame and having outer heads adapted to slidably engage a relatively stationary part of the vehicle, and a back pivoted to the upper portion of said second rod, said seat having an upwardly and rearwardly projecting lip adapted to engage the lower edge of said back to hold the latter in operative position.

3. A vehicle seat comprising a pair of spaced cylinders fixed to the vehicle, pistons in said cylinders, springs urging said pistons upwardly, a rod supported by said pistons, a second rod slidably mounted on said first mentioned rod at right angles thereto and having a lower right-angled extension adapted to abut a relatively stationary part of the vehicle, a seat having its outer edge pivoted to said first mentioned rod, a frame pivoted and slidable on said first mentioned rod, bolts having outer heads adapted to abut a stationary part of the vehicle, said bolts being slidably mounted in the lower part of said frame, means for resiliently holding said bolts in their outer projected positions, a jointed brace rod connecting the under side of said seat with the lower part of said frame, and a back pivoted to the upper portion of said second rod, said seat having an upwardly projecting lip adapted to engage the lower edge of said back and hold it in operative position.

4. A vehicle seat comprising a rod resiliently mounted adjacent its ends for movement in a vertical plane, a second rod slidably mounted on said first mentioned rod at right angles thereto and having an angular extension adapted to abut a stationary part of the vehicle, a seat having its outer edge pivoted to said first mentioned rod, a frame pivoted and slidable on said first mentioned rod, resilient means mounted in the lower part of said frame and adapted to slide against a relatively stationary part of the vehicle, a jointed brace rod connecting the outer under side of said seat with the lower part of said frame, and a back pivoted to the upper portion of said second rod, said seat having means to engage the lower edge of said back and hold the same in operative position.

5. A vehicle seat comprising a pair of stationary supports, a rod resiliently mounted adjacent its ends on said supports, a second rod slidably mounted on said first mentioned rod at right angles thereto and having an angular end portion adapted to abut a stationary part of the vehicle, a seat pivoted to said first mentioned rod, a member depending from said first mentioned rod, resilient means projecting from said member and adapted to slidably engage a relatively stationary part of the vehicle, a jointed brace rod connecting the under side of said seat with the said member, and a back pivoted to the upper portion of said second rod, said seat having a projection adapted to engage the lower edge of said back to hold the same in operative position.

6. A vehicle seat comprising a pair of spaced cylinders secured to the vehicle, piston rods slidable through the lower heads of said cylinders, pistons secured to the upper ends of said rods, springs surrounding said rods in said cylinders, nuts screwed on the outer ends of said piston rods, said pistons having upper extensions provided with transverse apertures, a rod passing through said apertures, a seat formed of sheet metal and having a pair of sleeves formed on its outer edge surrounding said first rod, a U-shaped frame of sheet metal pivoted on said rod between said sleeves, a knuckle jointed brace rod connecting the under side of said seat with the lower part of said frame, bolts slidably mounted in the lower part of said frame and having outer heads adapted to slidably engage a relatively stationary part of the vehicle, springs surrounding said bolts between the outer heads thereof and said frame, and nuts on the inner ends of said bolts.

7. A vehicle seat comprising a pair of spaced cylinders secured to the vehicle, piston rods slidable through the lower heads of said cylinders, pistons secured to the upper ends of said rods, springs surrounding said rods in said cylinders, a nut screwed on the outer end of each rod, a rod slidably supported by said pistons, a seat having its outer edge pivoted on said rod, a frame pivotally depending from said rod, and a knuckle-jointed brace rod connecting the under side of said seat with the lower part of said frame, said frame having bolts resiliently mounted in the lower part thereof and having outwardly projecting heads adapted to slidably engage a relatively stationary part of the vehicle.

8. A vehicle seat comprising a rod resiliently mounted adjacent its ends for movement in a vertical plane, a seat having its outer edge pivoted on said rod, a frame pivoted and slidable on said rod, laterally acting cushioning means mounted in the lower part of said frame and adapted to slide against a relatively stationary part of said vehicle, and a jointed brace rod connecting the under side of said seat with the lower part of said frame.

9. In a seat of the kind described a seat portion consisting of a metal plate with upwardly rolled back and side edges and downwardly rolled front edge said front edge having a plurality of integral hooks projecting rearwardly therefrom said plate having an aperture formed therein near its rear side and a downwardly and forwardly extending hook projecting from the under side of said plate in front of said aperture.

10. In a seat of the kind described, a seat portion consisting of a metal plate having a pair of sleeves formed integrally with its outer edge and having upwardly rolled back and side edges and a downwardly rolled front edge, said front edge having a plurality of integral hooks projecting rearwardly therefrom, said plate having an aperture in its rear part and having a downwardly and forwardly extending hook projecting from the under side thereof in front of said aperture.

11. In a seat of the kind described, a seat portion consisting of a metal plate with upwardly rolled back and side edges and a downwardly rolled front edge, said front edge having a hook projecting rearwardly therefrom, and means at the rear part of the plate for detachably securing the rear end of a cushion to said plate.

12. A vehicle seat comprising a seat member pivotally and slidably mounted at one side edge on a supporting element, and a back member pivotally mounted at one side edge to a supporting element disposed at a right angle to the supporting element of the seat member, and means carried by the seat member coacting with the lower end of the back member to hold the same in operative position.

13. A vehicle seat comprising a seat supporting rod disposed longitudinally on the side of the vehicle, a seat member consisting of a plate pivotally and slidably mounted at one side edge on said rod, a second rod slidably mounted on the first named rod at right angles thereto, a back member consisting of a plate pivotally mounted at one side edge to said second named rod, the seat member having an upwardly projecting rear end adapted to engage the lower edge of the said back member to hold the same in operative position.

HIRAM S. ROBERTS.